(12) United States Patent
Grabarnik et al.

(10) Patent No.: US 7,836,451 B2
(45) Date of Patent: Nov. 16, 2010

(54) METHOD, SYSTEM AND PROGRAM PRODUCT FOR APPROXIMATING RESOURCE CONSUMPTION OF A COMPUTER SYSTEM

(75) Inventors: Genady Grabarnik, Scarsdale, NY (US); Moon J. Kim, Wappingers Falls, NY (US); Lev Kozakov, Stamford, CT (US); Sheng Ma, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1727 days.

(21) Appl. No.: 11/011,344

(22) Filed: Dec. 14, 2004

(65) Prior Publication Data
US 2006/0130067 A1    Jun. 15, 2006

(51) Int. Cl.
G06F 9/46      (2006.01)
G06F 15/177    (2006.01)
(52) U.S. Cl. .................. 718/104; 718/105; 709/220
(58) Field of Classification Search ............. 709/220; 718/104–105
See application file for complete search history.

(56) References Cited

U.S. PATENT DOCUMENTS

| | | | | |
|---|---|---|---|---|
| 3,702,006 | A * | 10/1972 | Page ........................ | 718/105 |
| 4,056,846 | A * | 11/1977 | Callahan et al. ............. | 718/105 |
| 5,838,968 | A * | 11/1998 | Culbert ...................... | 718/104 |
| 5,862,337 | A * | 1/1999 | Gray ......................... | 709/224 |
| 6,011,537 | A | 1/2000 | Slotznick | |
| 6,061,761 | A * | 5/2000 | Bachmat ..................... | 711/114 |
| 6,086,618 | A * | 7/2000 | Al-Hilali et al. ............. | 703/2 |
| 6,112,257 | A * | 8/2000 | Mason et al. ................. | 710/18 |
| 6,189,022 | B1 * | 2/2001 | Binns ........................ | 718/100 |
| 6,223,205 | B1 | 4/2001 | Harchol-Balter et al. | |
| 6,247,173 | B1 | 6/2001 | Subrahmanyam | |
| 6,301,603 | B1 * | 10/2001 | Maher et al. ................ | 718/105 |
| 6,330,719 | B1 | 12/2001 | Zigmond et al. | |
| 6,338,072 | B1 * | 1/2002 | Durand et al. .............. | 707/205 |
| 6,338,089 | B1 | 1/2002 | Quinlan | |
| 6,341,333 | B1 * | 1/2002 | Schreiber et al. ............ | 711/114 |
| 6,389,028 | B1 | 5/2002 | Baondarenko et al. | |
| 6,415,027 | B1 | 7/2002 | Malik | |
| 6,442,650 | B1 * | 8/2002 | Bachmat et al. ............. | 711/114 |
| 6,487,578 | B2 | 11/2002 | Ranganathan | |
| 6,487,634 | B1 * | 11/2002 | Bachmat ..................... | 711/112 |

(Continued)

OTHER PUBLICATIONS

Adelzaher, "An Automated Profiling Subsystem for QoS-Aware Services", 2000.

(Continued)

Primary Examiner—Meng-Ai An
Assistant Examiner—Adam Lee
(74) Attorney, Agent, or Firm—William E. Schiesser; Hoffman Warnick LLC (57) ABSTRACT

Under the present invention, a computer work gradient matrix (hereinafter "matrix") is developed by applying a set of background loading levels and a set of elemental work increments to a computer system, and then measuring the resource consumption of the computer system based thereon. Task work path(s) are also constructed by applying specific tasks to the computer system at a certain background loading level, and measuring the resource consumption of the computer system over time. Once the matrix and task work path(s) have been provided, they can be used to approximate the resource consumption of the computer system in response to a task applied at any background loading level.

22 Claims, 7 Drawing Sheets

U.S. PATENT DOCUMENTS

| | | | |
|---|---|---|---|
| 6,574,587 | B2 | 6/2003 | Waclawski |
| 6,584,097 | B1 | 6/2003 | Malik |
| 6,601,084 | B1 | 7/2003 | Bhaskaran et al. |
| 6,606,661 | B1 | 8/2003 | Agrawal et al. |
| 6,618,742 | B1 * | 9/2003 | Krum ......................... 718/100 |
| 6,694,405 | B2 * | 2/2004 | Lam et al. ................... 711/112 |
| 6,711,649 | B1 * | 3/2004 | Bachmat et al. ............. 711/114 |
| 6,714,536 | B1 | 3/2004 | Dowling |
| 6,766,416 | B2 * | 7/2004 | Bachmat .................... 711/114 |
| 6,801,906 | B1 | 10/2004 | Bates et al. |
| 6,832,255 | B1 | 12/2004 | Rumsewicz et al. |
| 6,859,834 | B1 | 2/2005 | Arora et al. |
| 6,990,525 | B1 | 1/2006 | Ying et al. |
| 7,089,159 | B2 | 8/2006 | Hachiya |
| 7,296,056 | B2 * | 11/2007 | Yaung ......................... 709/205 |
| 7,305,471 | B2 * | 12/2007 | Odhner et al. .............. 709/226 |
| 7,406,691 | B2 * | 7/2008 | Fellenstein et al. .......... 718/104 |
| 7,441,244 | B2 * | 10/2008 | Longobardi ................. 718/104 |
| 7,526,767 | B1 * | 4/2009 | Rhee et al. .................. 718/104 |
| 7,716,151 | B2 | 5/2010 | Tiwari et al. |
| 2002/0004833 | A1 | 1/2002 | Tonouchi |
| 2002/0083342 | A1 | 6/2002 | Webb et al. |
| 2003/0018762 | A1 | 1/2003 | Mullen |
| 2003/0149717 | A1 * | 8/2003 | Heinzman ................... 709/101 |
| 2004/0181794 | A1 * | 9/2004 | Coleman et al. ............ 718/104 |
| 2005/0107997 | A1 | 5/2005 | Watts et al. |
| 2006/0130067 | A1 | 6/2006 | Grabarnik et al. |
| 2006/0253855 | A1 * | 11/2006 | Grabarnik et al. ........... 718/104 |
| 2008/0262822 | A1 | 10/2008 | Hardwick et al. |

OTHER PUBLICATIONS

Ahituv et al., "A Model for Predicting and Evaluating Computer Resource Consumption", Dec. 1988, vol. 31, No. 12, pp. 1467-1473.

Ulrik Brandes et al, "Experiments on Graph Clustering Algorithms", Proc. 11th European Symposium Algorithms (ESA 2003), Sep. 19, 2003, pp. 568-571.

Chang-Shing Perng et al, "Data-driven Monitoring Design of Service Level and Resource Utilization", Integrated Network Management, 2005, IEEE International Symposium on Nice, France, May 15-19, 2005, Piscataway, NJ, USA, IEEE, May 15, 2005, pp. 89-101.

Lingyun Yang, et al, "Statistical Data Reduction for Efficient Application Performance Monitoring", Argonne National Laboratory Technical Report, Aug. 2005, pp. 1-14.

Grabarnik et al., U.S. Appl. No. 11/121,828, filed May 4, 2005, Office Action Communication dated Dec. 30, 2009, 18 pages.

Grabarnik et al., U.S. Appl. No. 11/121,828, filed May 4, 2005, Notice of Allowance and Fee(s) Due dated Jul. 6, 2010, 21 pages.

Neurauter, Notice of Allowance and Fee(s) Due for U.S. Appl. No. 11/390,527 dated Jul. 26, 2010, 26 pages.

* cited by examiner

METHOD, SYSTEM AND PROGRAM PRODUCT FOR APPROXIMATING RESOURCE CONSUMPTION OF A COMPUTER SYSTEM

FIELD OF THE INVENTION

In general, the present invention relates to the approximation/estimation of computer resource consumption. Specifically, the present invention relates to a method, system and program product for approximating resource consumption of a computer system.

BACKGROUND OF THE INVENTION

Resource utilization/consumption is one of the critical characteristics of any computing task. This is especially the case for a grid computing environment. In general, a vast quantity of computing power is often wasted due to the under-utilization of resources. To date, planning and sizing for computing requirements has typically been based on peak demand. However, statistically speaking, the actual resource utilization is usually on the order of 60% for the IBM S/390 (zSeries) machines, and under 10% for current AIX and Intel machines. Harnessing the unutilized computing power can provide immediate economic benefits to any organization that has a large installed base of servers.

Grid infrastructure is defined as flexible, secure, coordinated resource sharing among a dynamic collection of individuals, institutions, and resources. It is distinguished from conventional distributed (enterprise) computing by its focus on large-scale resource sharing, innovative applications, and, in some cases, high-performance orientation. The collection of individual resources and institutions that contribute resources to a particular grid and/or use the resources in that grid, is referred to as a virtual organization and represents a new approach to computing and problem solving based on collaboration among multiple disciplines in computation and data-rich environments. To add a resource under the grid infrastructure, current resource utilization information is needed. This is an important attribute of the "Grid Resource Manager," which allocates the resources within the grid based on the resource requirements of the application(s).

Another need for the approximation/estimation of computing resources is for installation of software packages. Specifically, before installing a software package or application on a given computer, a user needs to know what resources (e.g., memory, CPU, etc.) will be required. Another important question is how much time and computing resources are needed to run a given task on a given machine with some other tasks and services running in the background. Usually, to find answers to these questions, users turn to the software documentation, which may contain a list of resource requirements, and, sometimes, application performance data. The problem is that such documentation data is only valid for one particular hardware/software configuration, and can hardly be applied to any other configuration. In addition, the performance data is usually obtained in an experiment, when the given software task was running in parallel with other tasks and services. There is no easy way to estimate how much the performance data will change, if the machine loading changes.

In view of the foregoing, there exists a need for a method, system and program product for approximating/estimating computer resource consumption. To this extent, a need exists whereby a computer work gradient matrix can be developed that characterizes the ability of a computer system to provide requested resources on top of different background loading levels and incremental work elements. A further need exists for a system that provides a task work path that characterizes resources consumed by a particular task as a function of time. Still yet, a further need exists for the matrix and task work path to be used to approximate the resource consumption when a specific task is applied to the computer system at any background loading level.

SUMMARY OF THE INVENTION

In general, the present invention provides a method, system and program product for approximating/estimating computer resource consumption. Specifically, under the present invention, a computer work gradient matrix (hereinafter "matrix") is developed by applying a set of background loading levels and a set of elemental work increments to the computer system, and then measuring the resource consumption of the computer system based thereon. Task work path(s) are also constructed by applying specific tasks to the computer system at a certain background loading level, and measuring the resource consumption of the computer system over time. Once the matrix and task work path(s) have been provided, they can be used to approximate the resource consumption of the computer system in response to a task applied at any background loading level.

A first aspect of the present invention provides a method for approximating resource consumption of a computer system, comprising: building a computer work gradient matrix that sets forth consumption levels of a set of resources of the computer system in response to a set of background loading levels and a set of elemental work increments applied to the computer system; constructing a set of task work paths that characterize consumption levels of the set of resources in response to a computing task applied to the computer system at a particular background loading level; and approximating consumption levels of the set of resources for the computing task at any background loading level using the computer work gradient matrix and the set of task work paths.

A second aspect of the present invention provides a system for approximating resource consumption of a computer system, comprising: a system for building a computer work gradient matrix that sets forth consumption levels of a set of resources of the computer system in response to a set of background loading levels and a set of elemental work increments applied to the computer system; a system for constructing a set of task work paths that characterize consumption levels of the set of resources in response to a computing task applied to the computer system at a particular background loading level; and a system for approximating consumption levels of the set of resources for the computing task at any background loading level using the computer work gradient matrix and the set of task work paths.

A third aspect of the present invention provides a program product stored on a recordable medium for approximating resource consumption of a computer system, which when executed, comprises: program code for building a computer work gradient matrix that sets forth consumption levels of a set of resources of the computer system in response to a set of background loading levels and a set of elemental work increments applied to the computer system; program code for constructing a set of task work paths that characterize consumption levels of the set of resources in response to a computing task applied to the computer system at a particular background loading level; and program code for approximating consumption levels of the set of resources for the computing task at any background loading level using the computer work gradient matrix and the set of task work paths.

A fourth aspect of the present invention provides a method for deploying an application for approximating resource consumption of a computer system, comprising: providing a computer infrastructure being operable to: build a computer work gradient matrix that sets forth consumption levels of a set of resources of the computer system in response to a set of background loading levels and a set of elemental work increments applied to the computer system; construct a set of task work paths that characterize consumption levels of the set of resources in response to a computing task applied to the computer system at a particular background loading level; and approximate consumption levels of the set of resources for the computing task at any background loading level using the computer work gradient matrix and the set of task work paths.

A fifth aspect of the present invention provides computer software embodied in a propagated signal for approximating resource consumption of a computer system, the computer software comprising instructions to cause a computer system to perform the following functions: build a computer work gradient matrix that sets forth consumption levels of a set of resources of the computer system in response to a set of background loading levels and a set of elemental work increments applied to the computer system; construct a set of task work paths that characterize consumption levels of the set of resources in response to a computing task applied to the computer system at a particular background loading level; and approximate consumption levels of the set of resources for the computing task at any background loading level using the computer work gradient matrix and the set of task work paths.

Therefore, the present invention provides a method, system and program product for approximating computer resource consumption.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:
I. General Description
  A. Computer Work Gradient Matrix
  B. Task Work Path
  C. Approximation of Resource Consumption
II. Computerized Implementation I. General Description As indicated above, the present invention provides a method, system and program product for approximating/estimating computer resource consumption. Specifically, under the present invention, a computer work gradient matrix (hereinafter "matrix") is developed by applying a set of background loading levels and a set of elemental work increments to the computer system, and then measuring the resource consumption of the computer system based thereon. Task work path(s) are also constructed by applying specific tasks to the computer system at a certain background loading level, and measuring the resource consumption of the computer system over time. Once the matrix and task work path(s) have been provided, they can be used to approximate the resource consumption of the computer system in response to a task applied at any background loading level.

A. Computer Work Gradient Matrix (Matrix)

Figure 1:
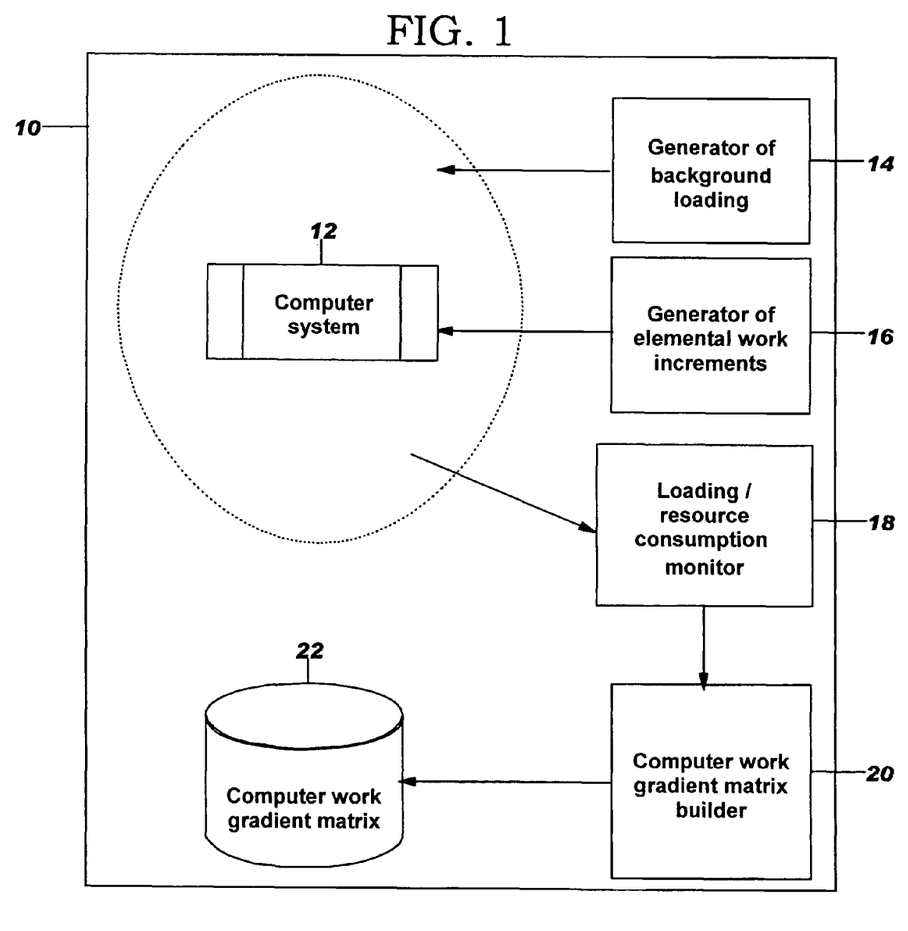
FIG. 1 depicts a system for building a computer work gradient matrix according to the present invention.

Referring now to FIG. 1, an illustrative system 10 for building a matrix 22 is shown. In general, matrix 22 is built for a given computer system 12. As such, matrix 22 characterizes the ability of computer system 12 to provide requested resources (e.g., memory, processing unit/CPU) on top of different background loading levels. Thus, matrix 22 is typically unique for the given computer configuration, and is a function of the background loading.

To build matrix 22 under the present invention, a generator of background loading 14 runs a set of calibrated tasks to provide a set (e.g., one or more) of predefined levels of background loading for computer system 12. For each level of background loading, generator of elemental work increments 16 performs a set of predefined operations to emulate small work increments associated with each significant computing resource. In a typical embodiment, generator of elemental work increments 16 will emulate work in increments of 1% or the like. As background loading and work increments are being applied to computer system 12, a loading/resource consumption monitor 18 will measure the changes in the loading/resource consumption. Based on these measurements, a computer work gradient matrix builder 20 calculates and stores the elements of the matrix.

This process is further illustrated below:

(1) Generator of background loading 14 generates different loads of computer system 12 using predefined increments of load levels (e.g., 5%, 10%, . . . , 100%) for each of the measurement coordinates (e.g., memory utilization, CPU utilization, etc.). In an illustrative embodiment, for 2 measurement coordinates, all possible loads will be pairs {(0.0, 0.0), (0.0, 0.05),(0.0, 0.1), . . . , (0.05, 0.0), (0.05, 0.05), . . . (1.0, 1.0)} that are measured in relative units (e.g., % of CPU cycles and % of Main Memory).

(2) For each level of load, generator of elemental work increments 16 generates additional permanent requests for resources of the same predefined size (e.g., request for number of CPU cycles generating 5% of CPU Utilization within 1 second under minimal load, and another request for 5% of Memory).

(3) For the load creation, loading/resource consumption monitor 18 controls the background load level of computer system 12.

(4) After incremental requests are generated, computer work gradient matrix builder 20 obtains results of the measurements from loading/resource consumption monitor 18 showing how fast computer system 12 is able to provide requested resources. It then creates elements of matrix 22 as fraction/ratio of appropriate measurement (e.g., number of cycles generating 5% of CPU utilization within 1 second under minimal load to the time it took). In some cases, when computer system 12 already is running say under 97% of CPU utilization, it is unable to provide proper resources, in this case the time needed to fulfill the request is set to infinity and appropriate element of the matrix 22 will be 0.

(5) Matrix 22 is stored for further usage.

Figure 2:
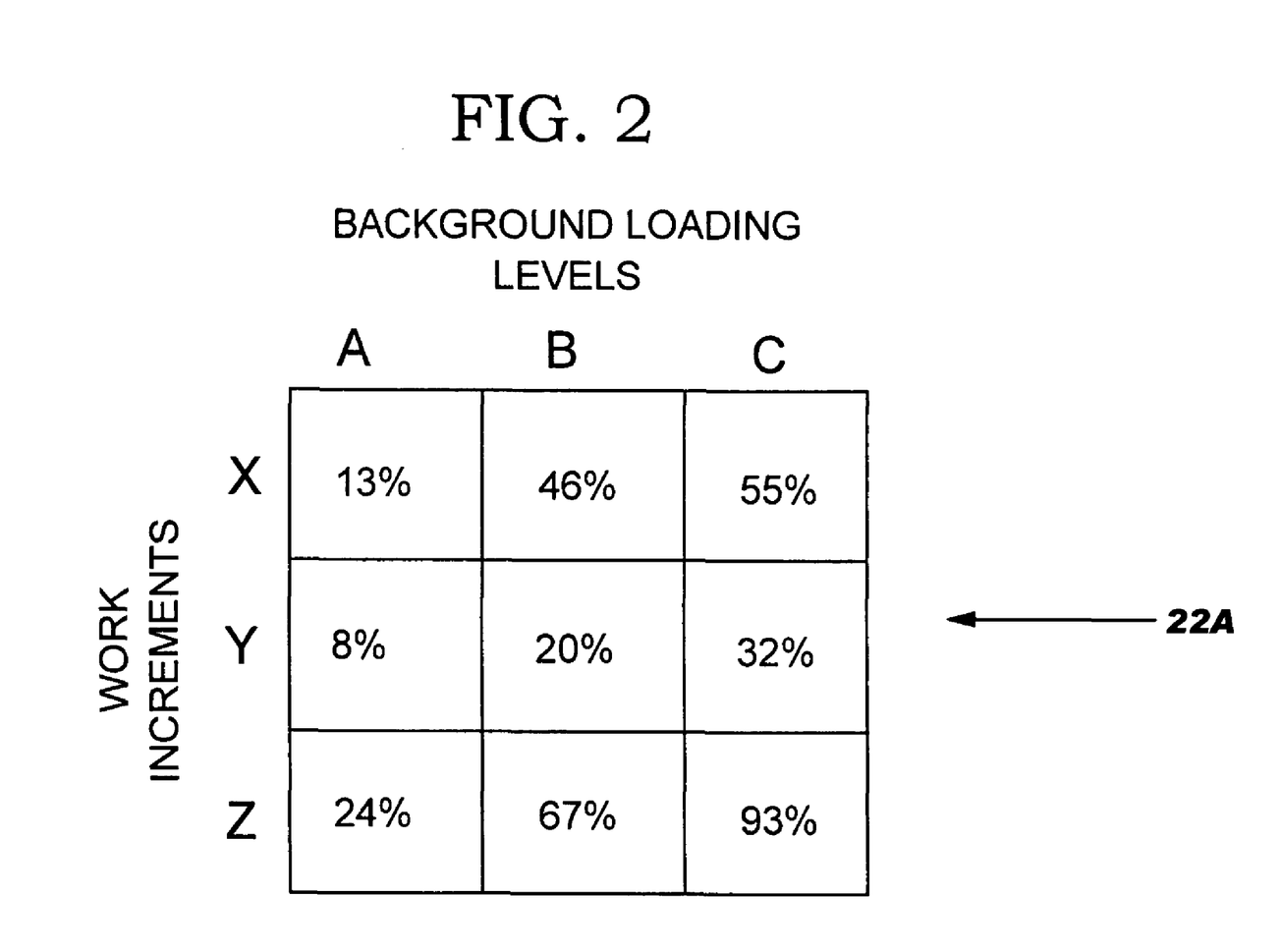
FIG. 2 depicts an illustrative face of a computer work gradient matrix according to the present invention.

In general, matrix 22 is a multidimensional structure (e.g., 2-dimensional, 3-dimensional, etc.) that sets forth consumption levels of a set of resources of the computer system 12 in response to a set of background loading levels and a set of elemental work increments applied to the computer system 12. In a typical embodiment, matrix 22 is a cube-like structure wherein each portion or face represents a different computer resource. For example, one face of matrix 22 could represent CPU utilization, while another represents memory utilization. Referring to FIG. 2, an illustrative face 22A of a matrix 22 (FIG. 1) is shown. Assume in this illustrative example that face 22A pertains to CPU utilization. As can be seen, face 22A provides three levels of background loading (A-C) and three levels of elemental work increments (X-Z). The values within the cells of face 22A represent the CPU utilization for the respective levels of background loading and element work increments. For example, for background loading level "B" and elemental work increment level "Z," CPU utilization of computer system 12 was 67%. By building matrix 22 in this manner, a snapshot of computer system 12's resource consumption in view of varying levels of background loading and elemental work increments can be developed. It should be appreciated that face 22A is intended to be illustrative only. As such, three levels of background loading and elemental work increments are shown for illustrative purposes only.

B. Task Work Path

Figure 3:
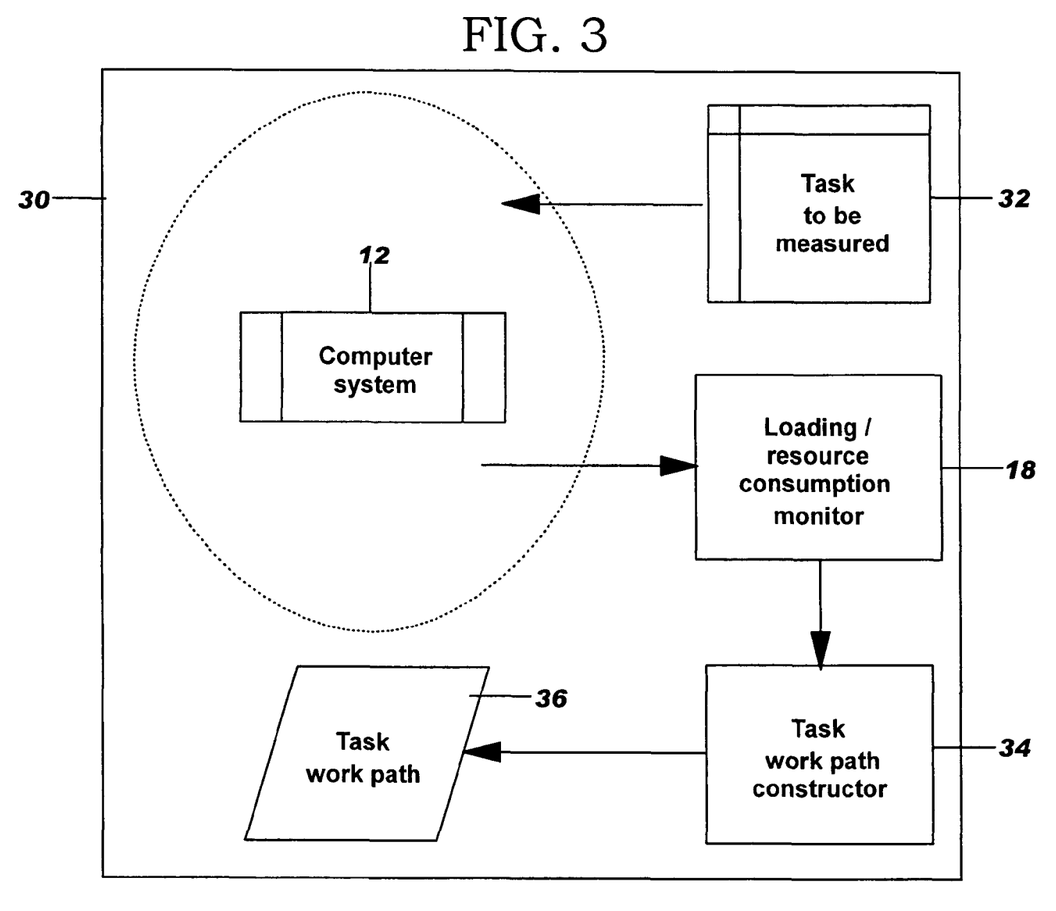
FIG. 3 depicts a system for constructing a task work path according to the present invention.

Referring now to FIG. 3, an illustrative system 30 for constructing a set (e.g., one or more) of task work paths 36 is shown in detail. A task work path 36 typically characterizes consumption levels of the resources in response to a computing task applied to computer system 12 at a particular/fixed background loading level (as a function of time).

As shown in FIG. 3, a given computing task 32 starts/is applied to computer system 12. Loading/resource consumption monitor 18 measures current initial background loading levels, as well as all the changes in the loading/resource consumption during the task 32 execution. Task work path constructor 34 processes these measurements at small predefined time intervals, and constructs task work path 36 for the given initial background loading level(s).

This process is further illustrated below:

(1) Task 32 that should be measured is run on the computer system 12.

(2) Loading/resource consumption monitor 18 measures the computer system 12 resource consumption as an initial load.

(3) Loading/Resource consumption monitor 18 creates computer system 12 resources consumption snapshots at times with predefined increments (e.g., 5 seconds).

(4) Task work path constructor 34 uses computer system 12 resources snapshots to generate task work path 36 as a temporal path in the space of measurements.

Figure 4:
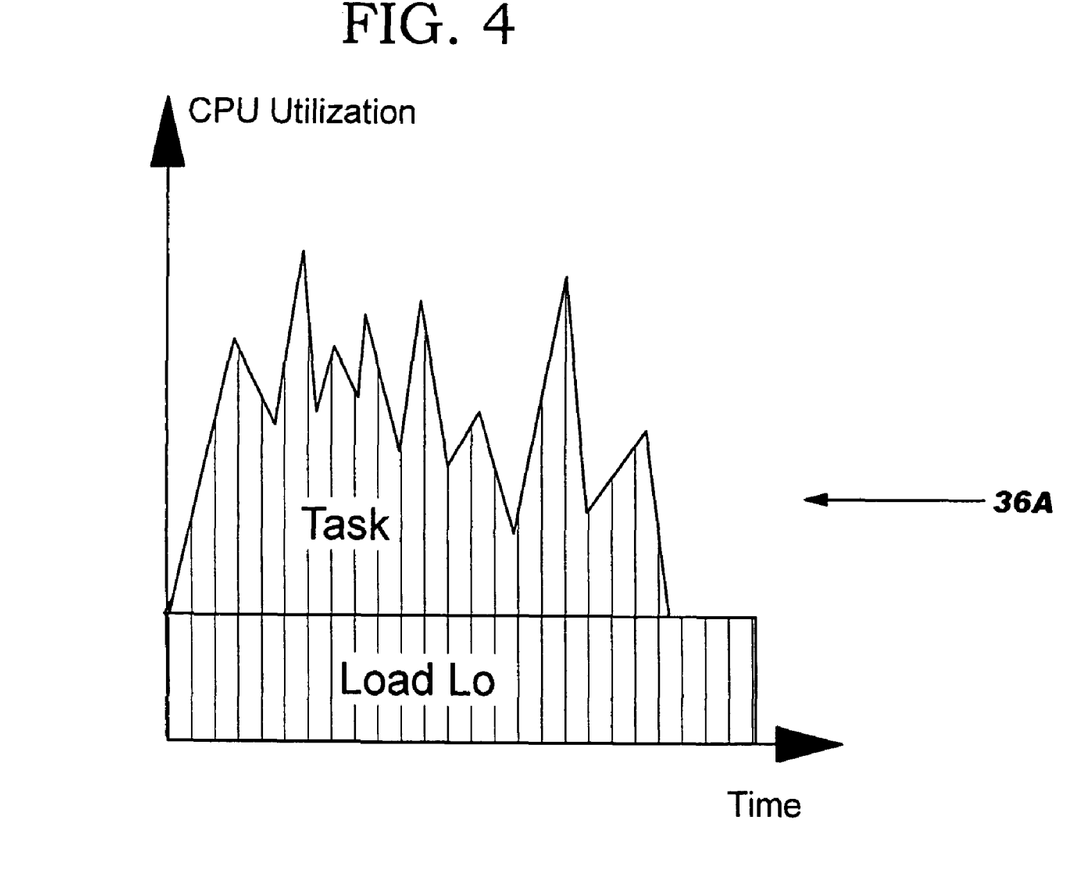
FIG. 4 depicts a first illustrative task work path according to the present invention.
Figure 5:
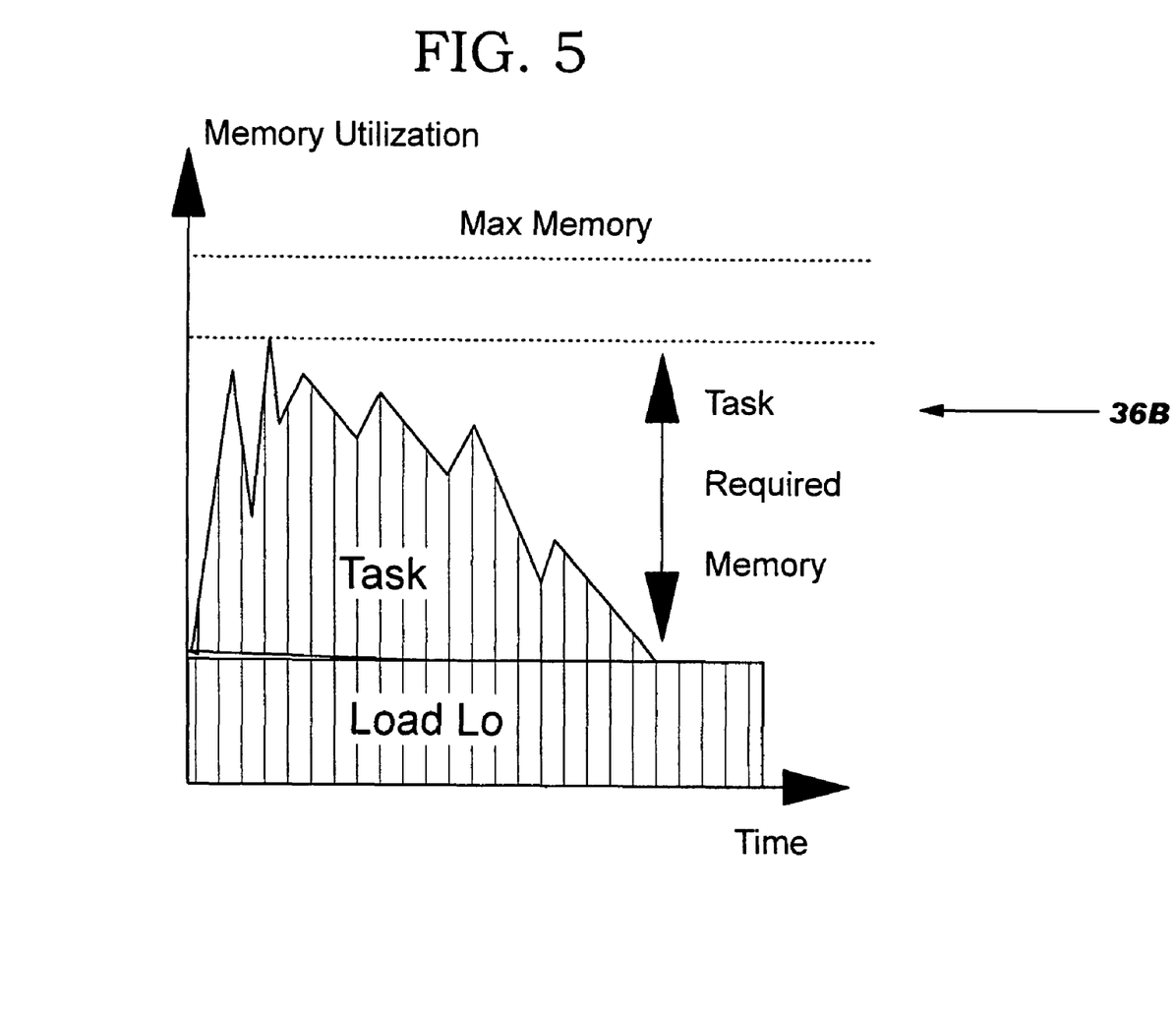
FIG. 5 depicts a second illustrative task work path according to the present invention.

Referring to FIGS. 4 and 5, illustrative task work paths 36A-B are shown. Specifically, FIG. 4 depicts a task path 36A for CPU utilization over time in response to the task 32 as applied to computer system 12 (FIG. 3) at a fixed level of background loading. FIG. 5 depicts a task path 36B for memory utilization over time in response to the same task 32.

C. Approximation of Resource Consumption

Figure 6:
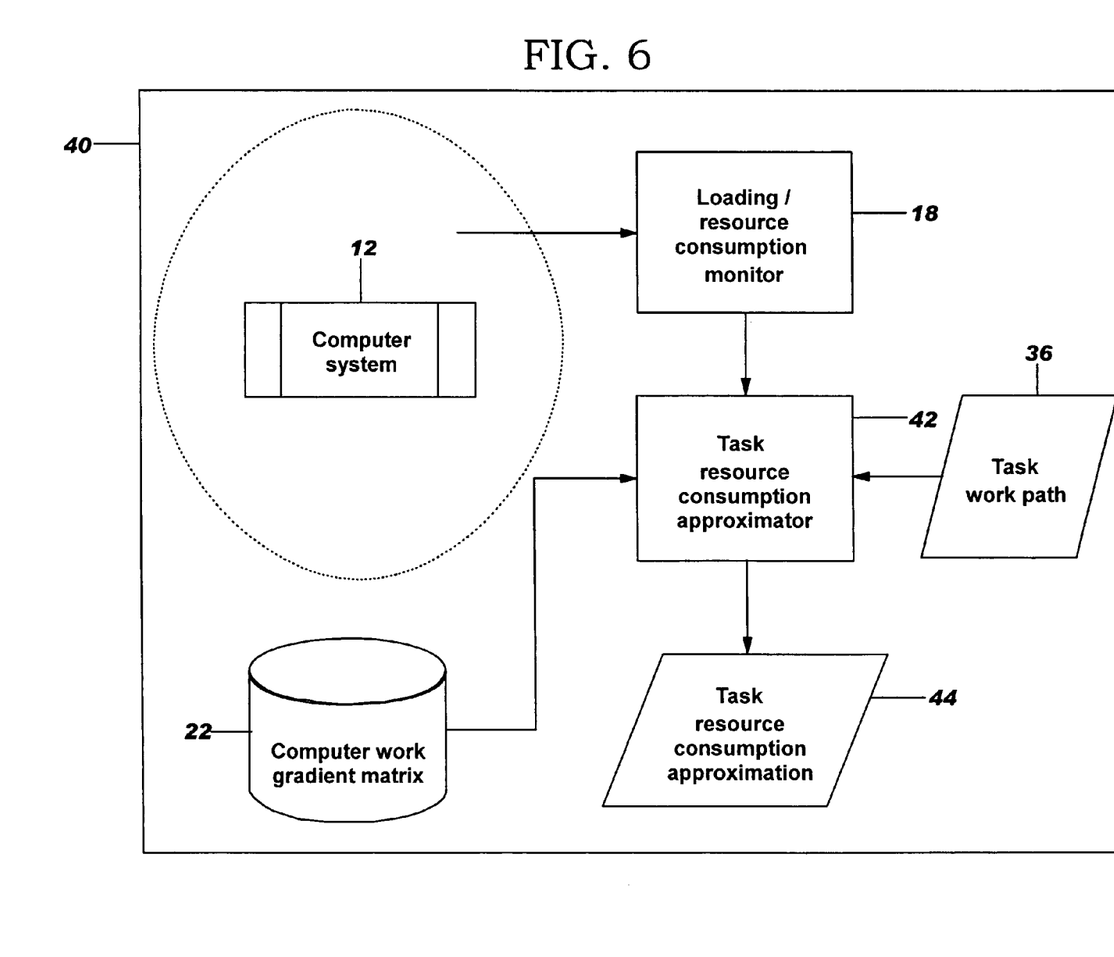
FIG. 6 depicts an illustrative system for approximating computer resource consumption using a computer work gradient matrix and task work path.

Once matrix 22 and task path(s) 36 have been provided as indicated above, they can then be used to approximate resource consumption for computer system 12 for a task at any background loading level. Referring now to FIG. 6, a system 40 for making this approximation is shown. Specifically, under system 40, loading/resource consumption monitor 18 measures the current background loading level, and passes the measurements to task resource consumption approximator 42. The task resource consumption approximator 42 then determines an approximation of the task resource consumption 44 by applying the given matrix 22 to appropriate elements along the task work path 36 in a relation to the initial computer background loading levels, measured when the original task work path 36 was built.

This process is further illustrated below:

(1) Loading/resource consumption monitor 18 provides the level of the current background loading for computer system 12, which is where the task is to be run/applied.

(2) Task resource consumption approximator 42 loads the following information: current background loading of computer system 12 to be used for running the task, task work path 36 for the task to be run, matrix 22 for computer system 12 where task is to be run.

(3) Task resource consumption approximator 42 uses one of the methods of approximation based on current system background loading, matrix 22, and task work path 36 to calculate approximate resource consumption for the task.

(4) As an illustrative example of such an approximation, task resource consumption approximator 42 may perform the following operations:

(A) Cut task work path 36 into elemental pieces such that each elemental piece is contained in 1 level of load (coordinates) for matrix 22.

(B) Scale each elemental piece of task work path 36 with an associated coefficient from matrix 22.

(C) Combine the results into new approximate task work path (not shown)—this new task work path will show resource/time consumption for the given system load.

(5) Store resulting approximate resource/time consumption 44. Thus, by first developing matrix 22 and task work path 36, the resource consumption for any task under any background loading level can be approximated under the present invention.

II. Computerized Implementation

Figure 7:
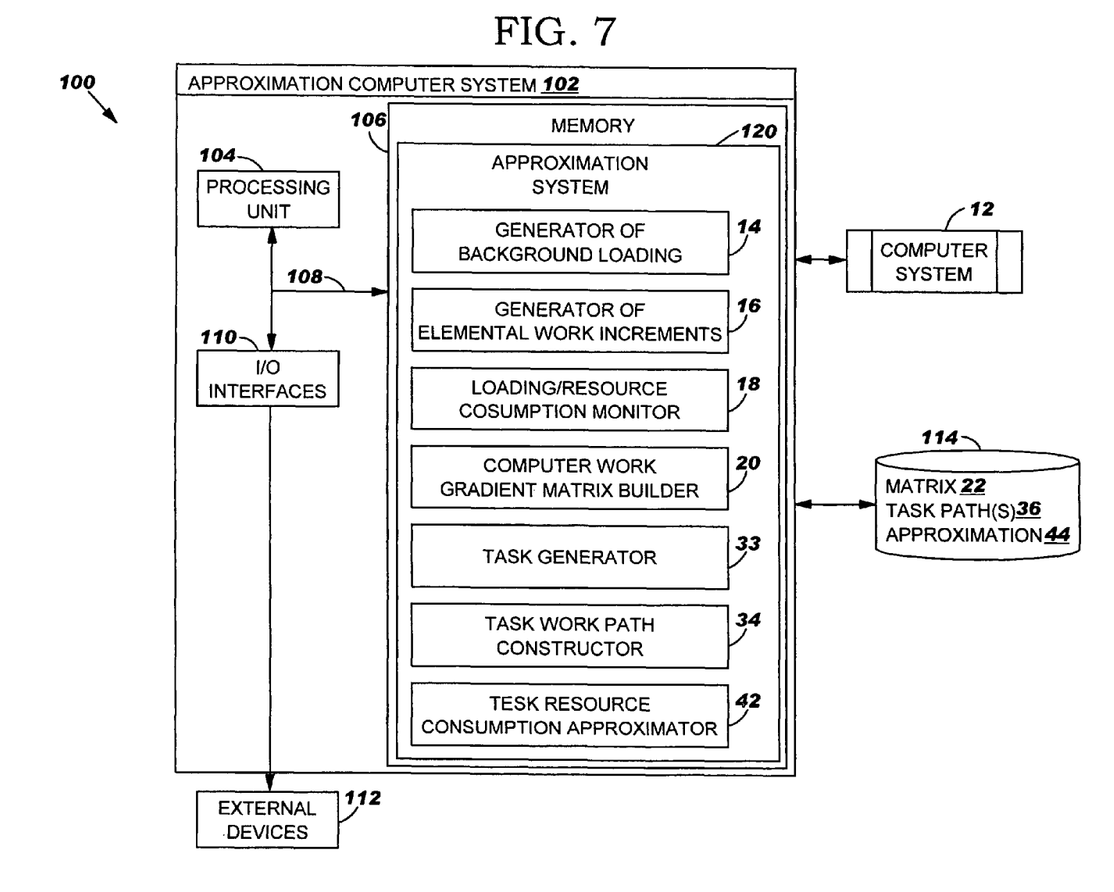
FIG. 7 depicts a more specific computerized implementation of the present invention.

Referring now to FIG. 7, a more specific computerized implementation 100 of the present invention is shown. As depicted, approximation computer system 102 is provided, which is intended to represent any type of computer system capable of carrying out the teachings of the present invention. For example, approximation computer system 102 can be a desktop computer, a laptop computer, a workstation, a handheld device, a client, a server, etc. To this extent, approximation computer system 102 can communicate with computer system 12 over a grid computing environment or a network such as the Internet, a local area network (LAN), a wide area network (WAN), a virtual private network (VPN), etc. Communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, approximation computer system 102 generally includes processing unit 104, memory 106, bus 108, input/output (I/O) interfaces 110, external devices/resources 112 and storage unit 114. Processing unit 104 may comprise a single processing unit, or be distributed across one or more processing units in one or more locations, e.g., on a client and server. Memory 106 may comprise any known type of data storage and/or transmission media, including magnetic media, optical media, random access memory (RAM), read-only memory (ROM), a data cache, a data object, etc. Moreover, similar to processing unit 104, memory 106 may reside at a single physical location, comprising one or more types of data storage, or be distributed across a plurality of physical systems in various forms.

I/O interfaces 110 may comprise any system for exchanging information to/from an external source. External devices/resources 112 may comprise any known type of external device, including speakers, a CRT, LED screen, hand-held device, keyboard, mouse, voice recognition system, speech output system, printer, monitor/display, facsimile, pager, etc. Bus 108 provides a communication link between each of the components in approximation computer system 102 and likewise may comprise any known type of transmission link, including electrical, optical, wireless, etc.

Storage unit 114 can be any type of system (e.g., a database) capable of providing storage for information (e.g., matrices 22, task work paths 36, approximations 44, etc.) under the present invention. As such, storage unit 114 could include one or more storage devices, such as a magnetic disk drive or an optical disk drive. In another embodiment, storage unit 114 includes data distributed across, for example, a local area network (LAN), wide area network (WAN) or a storage area network (SAN) (not shown). Although not shown, additional components, such as cache memory, communication systems, system software, etc., may be incorporated into approximation computer system 102. Moreover, although not shown, computer system 12 will likely include computerized elements similar to approximation computer system 102.

Shown in memory 106 of approximation computer system 102 is approximation system 120. As depicted, approximation system 120 includes the components of the present invention described above, namely, generator of background loading 14, generator of elemental work increments 16, loading/resource consumption monitor 18, computer work gradient matrix builder 20, task generator 33, task work path constructor 34 and task resource consumption approximator 42. These components generally perform the functions described above. Specifically, generator of background loading 14 and generator of elemental work increments 16 will apply levels of background loading and elemental work increments to computer system 12. As this is occurring, resource consumption monitor 18 will monitor the resource consumption of computer system 12. Based thereon, computer work gradient matrix builder 20 will build matrix 22 (e.g., for storage in storage unit 114).

In addition, task generator 33 can apply a task to computer system 12 (e.g., under a fixed level of background loading). As this is occurring, loading/resource consumption monitor 18 will monitor the resource consumption of computer system 12 and feed this information to task work path constructor 34, which will use the same to construct task work path(s) 36. Using matrix 22 and task work path 36, task resource consumption approximator 42 can later approximate resource consumption of computer system 12 in response to a certain task that is applied thereto any level of background loading.

It should be appreciated that the present invention could be offered as a business method on a subscription or fee basis. For example, approximation computer system 102, approximation system 120 or any of the components of the present invention shown in FIGS. 1-7, etc. could be created, supported, maintained and/or deployed by a service provider that offers the functions described herein for customers. That is, a service provider could offer to approximate resource consumption for customers.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, approximation system 120 is shown with a certain configuration of sub-systems for illustrative purposes only.

We claim:

1. A method for approximating resource consumption of a computer system, comprising:

building a computer work gradient matrix that sets forth consumption levels of a set of resources of the computer system in response to a set of background loading levels and a set of elemental work increments applied to the computer system;

executing a set of calibrated tasks to gather information used to achieve a predetermined background loading level of the set of background loading levels and, with the computer system operating at the background loading level, performing a set of predefined operations having known values measured in the set of elemental work increments on the computer system;

constructing a set of task work paths that characterize consumption levels of the set of resources in response to a computing task applied to the computer system at a particular background loading level of the set of background levels by executing the computing task and measuring the consumption levels of the computing task in the work increments; and approximating consumption levels of the set of resources for the computing task using the computer work gradient matrix, background loading level, and the set of task work paths.

2. The method of claim 1, wherein the building step comprises:
applying the set of background loading levels to the computer system;
applying the set of elemental work increments to the computer system;
monitoring the consumption levels of the set of resources in response to the applied set of background loading levels and set of elemental work increments; and
building the computer work gradient matrix based on the monitoring.

3. The method of claim 1, wherein the constructing step comprises:
applying the particular background loading level to the computer system;
applying the computing task to the computer system;
monitoring consumption levels for the set of resources in response to the particular background loading level and the computing task; and
constructing a set of task work paths for the set of resources based on the monitoring.

4. The method of claim 1, wherein the approximating step comprises:
monitoring a current background loading level of the computer system;
accessing the computer work gradient matrix and the set of task work paths; and
approximating the consumption levels of the set of resources for the computing task using computer work gradient matrix and the set of task work paths.

5. The method of claim 1, wherein the set of resources comprise memory utilization and CPU utilization.

6. The method of claim 1, wherein a separate task work path is constructed for each of the set of resources.

7. The method of claim 1, wherein each of the set of resources occupies a separate portion of the computer work gradient matrix.

8. A system for approximating resource consumption of a computer system, comprising:
a system for building a computer work gradient matrix that sets forth consumption levels of a set of resources of the computer system in response to a set of background loading levels and a set of elemental work increments applied to the computer system;
a system for executing a set of calibrated tasks to gather information used to achieve a predetermined background loading level of the set of background loading levels and, with the computer system operating at the background loading level, performing a set of predefined operations having known values measured in the set of elemental work increments on the computer system;
a system for constructing a set of task work paths that characterize consumption levels of the set of resources in response to a computing task applied to the computer system at a particular background loading level of the set of background levels by executing the computing task and measuring the consumption levels of the computing task in the work increments; and a system for approximating consumption levels of the set of resources for the computing task using the computer work gradient matrix, background loading level, and the set of task work paths.

9. The system of claim 8, wherein the system for building the computer work gradient matrix comprises:
a system for applying the set of background loading levels to the computer system;
a system applying the set of elemental work increments to the computer system;
a system for monitoring the consumption levels of the set of resources in response to the applied set of background loading levels and set of elemental work increments; and
a system for building the computer work gradient matrix based on the monitoring.

10. The system of claim 8, wherein the system for constructing a set of task work paths, comprises:
a system for applying the particular background loading level to the computer system;
a system for applying the computing task to the computer system;
a system for monitoring consumption levels for the set of resources in response to the particular background loading level and the computing task; and
a system for constructing a set of task work paths for the set of resources based on the monitoring.

11. The system of claim 8, wherein the system for approximating consumption levels comprises:
a system for monitoring a current background loading level of the computer system;
a system for accessing the computer work gradient matrix and the set of task work paths; and
a system for approximating the consumption levels of the set of resources for the computing task using computer work gradient matrix and the set of task work paths.

12. The system of claim 8, wherein the set of resources comprise memory utilization and CPU utilization.

13. The system of claim 8, wherein a separate task work path is constructed for each of the set of resources.

14. The system of claim 8, wherein each of the set of resources occupies a separate portion of the computer work gradient matrix.

15. A program product stored on a computer readable storage medium for approximating resource consumption of a computer system, which when executed, comprises:
program code for building a computer work gradient matrix that sets forth consumption levels of a set of resources of the computer system in response to a set of background loading levels and a set of elemental work increments applied to the computer system;
program code for executing a set of calibrated tasks to gather information used to achieve a predetermined background loading level and, with the computer system operating at the background loading level of the set of background loading levels, performing a set of predefined operations having known values measured in the set of elemental work increments on the computer system;
program code for constructing a set of task work paths that characterize consumption levels of the set of resources in response to a computing task applied to the computer system at a particular background loading level of the set of background levels by executing the computing task and measuring the consumption levels of the computing task in the work increments; and program code for approximating consumption levels of the set of resources for the computing task at using the computer work gradient matrix, background loading level, and the set of task work paths.

16. The program product of claim 15, wherein the program code for building the computer work gradient matrix comprises:

program code for applying the set of background loading levels to the computer system;

program code applying the set of elemental work increments to the computer system;

program code for monitoring the consumption levels of the set of resources in response to the applied set of background loading levels and set of elemental work increments; and program code for building the computer work gradient matrix based on the monitoring.

17. The program product of claim 15, wherein the program code for constructing a set of task work paths, comprises:

program code for applying the particular background loading level to the computer system;

program code for applying the computing task to the computer system;

program code for monitoring consumption levels for the set of resources in response to the particular background loading level and the computing task; and program code for constructing a set of task work paths for the set of resources based on the monitoring.

18. The program product of claim 15, wherein the program code for approximating consumption levels comprises:

program code for monitoring a current background loading level of the computer system;

program code for accessing the computer work gradient matrix and the set of task work paths; and program code for approximating the consumption levels of the set of resources for the computing task using computer work gradient matrix and the set of task work paths.

19. The program product of claim 15, wherein the set of resources comprise memory utilization and CPU utilization.

20. The program product of claim 15, wherein a separate task work path is constructed for each of the set of resources.

21. The program product of claim 15, wherein each of the set of resources occupies a separate portion of the computer work gradient matrix.

22. A method for deploying an application for approximating resource consumption of a computer system, comprising:

providing a computer infrastructure being operable to:

build a computer work gradient matrix that sets forth consumption levels of a set of resources of the computer system in response to a set of background loading levels and a set of elemental work increments applied to the computer system;

execute a set of calibrated tasks to gather information used to achieve a predetermined background loading level of the set of background loading levels and, with the computer system operating at the background loading level, performing a set of predefined operations having known values measured in the set of elemental work increments on the computer system;

construct a set of task work paths that characterize consumption levels of the set of resources in response to a computing task applied to the computer system at a particular background loading level of the set of background levels by executing the computing task and measuring the consumption levels of the computing task in the work increments; and approximate consumption levels of the set of resources for the computing task using the computer work gradient matrix, background loading level, and the set of task work paths.

* * * * *